US011974709B2

(12) United States Patent
Hillson et al.

(10) Patent No.: US 11,974,709 B2
(45) Date of Patent: May 7, 2024

(54) CLEANING CART SWEEPING ATTACHMENT

(71) Applicant: United States Government as Represented by the Department of Veterans Affairs, Washington, DC (US)

(72) Inventors: Larry Hillson, Reno, NV (US); Micah Hambleton, Sparks, NV (US)

(73) Assignee: United States Government As Represented By The Department Of Veterans Affairs, Washington, DC (US)

( * ) Notice: Subject to any disclaimer, the term of this patent is extended or adjusted under 35 U.S.C. 154(b) by 534 days.

(21) Appl. No.: 17/220,352

(22) Filed: Apr. 1, 2021

(65) Prior Publication Data

US 2021/0307585 A1   Oct. 7, 2021

Related U.S. Application Data

(60) Provisional application No. 63/003,462, filed on Apr. 1, 2020.

(51) Int. Cl.
| | |
|---|---|
| *B62B 3/02* | (2006.01) |
| *A47L 13/38* | (2006.01) |
| *A47L 13/42* | (2006.01) |
| *B62B 3/00* | (2006.01) |

(52) U.S. Cl.
CPC .............. *A47L 13/38* (2013.01); *A47L 13/42* (2013.01); *B62B 3/005* (2013.01); *B62B 3/02* (2013.01); *B62B 2202/50* (2013.01)

(58) Field of Classification Search
CPC . B62B 3/02; A47L 13/38; A47L 13/42; E01H 1/05
See application file for complete search history.

(56) References Cited

U.S. PATENT DOCUMENTS

| | | | | |
|---|---|---|---|---|
| 10,850,758 | B1 * | 12/2020 | Griffith | ................... B62B 3/02 |
| 11,235,793 | B1 * | 2/2022 | Koester | .................. B62B 3/102 |
| 2021/0213987 | A1 * | 7/2021 | Greenblatt | ............. B62B 5/065 |
| 2021/0229720 | A1 * | 7/2021 | Burns | ....................... B62B 3/04 |
| 2022/0119022 | A1 * | 4/2022 | Duka-Cort | ............ B62B 5/0013 |

* cited by examiner

*Primary Examiner* — Michael D Jennings
(74) *Attorney, Agent, or Firm* — Ballard Spahr LLP

(57) ABSTRACT

A cleaning cart can comprise a body defining an underside and at least one shelf, wherein the body has a footprint. A plurality of wheels can rotatably couple to the body. A sweeping attachment can be coupled to the underside of the body. The sweeping attachment can comprise a slide comprising a track that is coupled to the body and a carriage that is configured to slide relative to the track along an axis about and between a first position that is generally within the footprint of the body and a second position that is generally outside of the footprint of the body. A sweeping assembly can be coupled to the carriage. The sweeping assembly can couple to a sweeping element.

16 Claims, 8 Drawing Sheets

ND OF PAGE

CLEANING CART SWEEPING ATTACHMENT

CROSS-REFERENCE TO RELATED APPLICATIONS

This application claims priority to, and the benefit of, the filing date of, U.S. Provisional Patent Application No. 63/003,462, filed Apr. 1, 2020, the entirety of which is hereby incorporated by reference herein.

FIELD

This application relates to systems and methods for providing a cleaning cart with a sweeping attachment.

BACKGROUND

Cleaning carts are conventionally used to carry cleaning supplies, hang a trash bag, support a mop bucket, and provide storage for various items (e.g., toiletries). Many facilities, such as hospitals, airports, schools, stadiums, etc., have large numbers of carts being regularly and concurrently transported throughout the facility, yet these conventional carts do not clean any area as they are transported. Instead, cleaning staff use sweeping and mopping devices that are separately transported throughout the facility.

SUMMARY

Disclosed herein, in one aspect, is a cleaning cart comprising a body defining an underside and at least one shelf, wherein the body has a footprint. A plurality of wheels can be rotatably coupled to the body. A sweeping attachment can be coupled to the underside of the body. The sweeping attachment can comprise a slide comprising a track that is coupled to the body and a carriage that is configured to slide relative to the track along a movement axis about and between a first position that is generally within the footprint of the body and a second position that is generally outside of the footprint of the body. A sweeping assembly can be coupled to the carriage. The sweeping assembly can extend downwardly from the carriage and can be configured to couple to a sweeping element.

The cleaning cart can further comprise the sweeping element that is coupled to the sweeping assembly. The sweeping element can be configured to engage a surface beneath the body of the cleaning cart during movement of the cleaning cart.

The plurality of wheels can comprise two front wheels and two rear wheels. The sweeping attachment can be disposed between the two front wheels and the two rear wheels.

The body can have a longitudinal dimension. The movement axis can be substantially perpendicular to the longitudinal dimension of the body.

The sweeping assembly can comprise an L-channel that is elongate along the movement axis. The L-channel can have a first leg and a second leg. The first leg can be coupled to the carriage, and the second leg can extend vertically downwardly from the first leg.

The sweeping assembly can comprise a biasing element that is configured to engage the sweeping element with a surface below the cleaning cart.

The biasing element can comprise at least one flexible polymer strip that extends along the movement axis and extends downwardly a sufficient distance to engage a floor surface below the cleaning cart.

The sweeping element can be a disposable dust sheet.

The cleaning cart can further comprise a handle coupled to the sweeping assembly at a distal end of the sweeping assembly.

The carriage can comprise a release that is configured to decouple the carriage from the track.

The body of the cleaning cart can define at least one compartment having a top opening.

The footprint of the body can have a width along a transverse axis that is perpendicular to the longitudinal axis. The sweeping assembly can have a length that is between 90% and 105% of the width of the footprint of the body.

The footprint of the body can have a width along the transverse axis and the sweeping assembly can have a length that is between 90% and 100% of the width of the footprint of the body.

When the carriage is in the first position, the sweeping assembly can be substantially within the footprint of the body of the cleaning cart.

When the carriage is in the first position, the sweeping assembly can be entirely within the footprint of the body of the cleaning cart.

When the carriage is in the second position, the sweeping assembly can be substantially entirely outside of the footprint of the body of the cleaning cart.

A sweeping attachment can be coupled to an underside of a body of a cleaning cart. The sweeping attachment can comprise a slide comprising a track and a carriage that is configured to slide relative to the track along an axis about and between a first position and a second position that is spaced from the first position along the axis. A sweeping assembly can be coupled to the carriage. The sweeping assembly can be configured to couple to a sweeping element.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
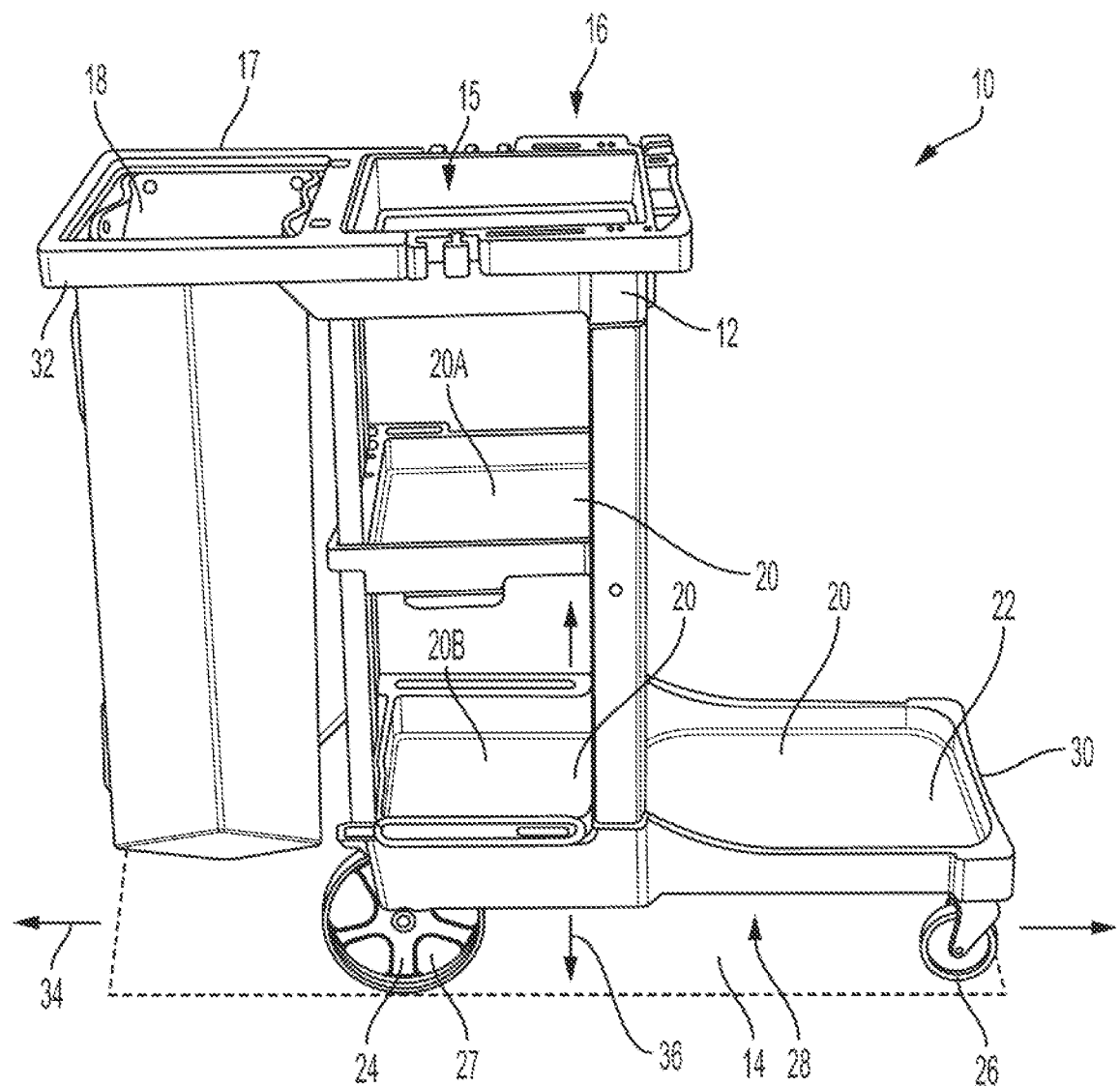
FIG. 1 is a side perspective view of a cleaning cart in accordance with embodiments disclosed herein.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a wheel" includes one or more of such wheels, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein, in various aspects and with reference to FIG. 1, is a cleaning cart 10 having a body 12 that defines a footprint 14 (corresponding to the space above a floor where the body 12 overlies the floor). For example, the cart can have an outer perimeter, and the outer perimeter can be projected vertically downwardly to the floor to define the footprint 14. The body 12 can define one or more compartments 15, each compartment 15 having a top opening 16. For example, the body can define a rim 17 that receives a bag 18 therein. The body 12 can comprise one or more shelves 20 that can be used for carrying cleaning supplies, toiletries, etc. Optionally, the body 12 can define a front shelf 22 that is configured to receive a mop bucket. The cleaning cart 10 can further comprise a plurality of wheels 24, such as, for example, two front casters 26 that are configured to swivel about vertical axes and two rear wheels 27 that rotate about fixed axes (i.e., the rear wheels 27 do not swivel). The cleaning cart 10 can have a front 30, a rear 32, a longitudinal axis 34 that extends horizontally between the front and the rear of the cart, and a transverse axis 36 that extends perpendicular to the longitudinal axis 34. Optionally, the body 12 can comprise a plurality of vertical supports (e.g., two front and two rear vertical supports) that support the top compartment 15, a bottom shelf 20B and a middle shelf 20A positioned between the bottom shelf and the top compartment. Each of the middle and bottom shelves 20A,B can have a peripheral rim that can retain items on the respective shelf. The front shelf 22 can be positioned forward of the bottom shelf 20B, in front of the two front vertical supports. The rim 17 can be positioned behind the top compartment 15.

Figure 2:
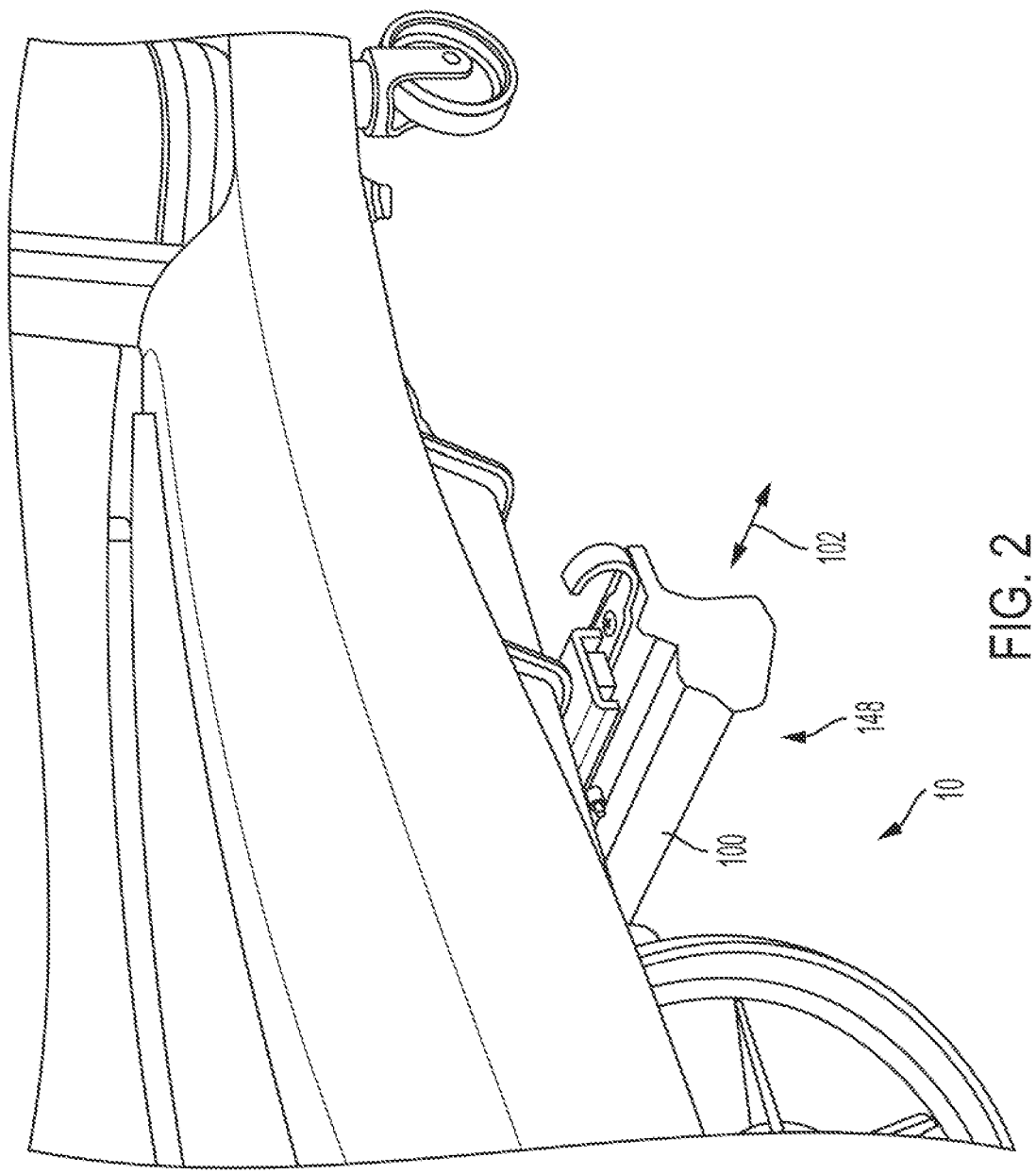
FIG. 2 is a perspective view of the cleaning cart of FIG. 1 with a sweeping attachment in a retracted, use configuration.

Referring to FIG. 2, a sweeping attachment 100 can couple to the body so that a portion of the sweeping attachment engages the floor. For example, the sweeping attachment 100 can attach to an underside 28 of the body 12 as the cart 10 is moved along the floor. Alternatively, in further optional aspects, the sweeping attachment 100 can attach to a front or a back end of the body and extend downwardly therefrom to engage the floor. In some aspects, the sweeping attachment can be coupled to the underside of the body between the front wheels and the rear wheels. The sweeping attachment 100 can have an axis of elongation 102. In some aspects, the axis of elongation can be parallel to, or generally parallel to, the transverse axis 36 of the cleaning cart 10. In further optional aspects, the axis of elongation 102 can be angled with respect to the transverse axis 36 by, for example, 0 to about 60 degrees, about 5 to about 45 degrees, or about 10 to about 30 degrees. In further embodiments, the axis of elongation 102 can be angled with respect to the transverse axis 36 by about five degrees, about ten degrees, about 15 degrees, about 30 degrees, about 45 degrees, or more.

Figure 5:
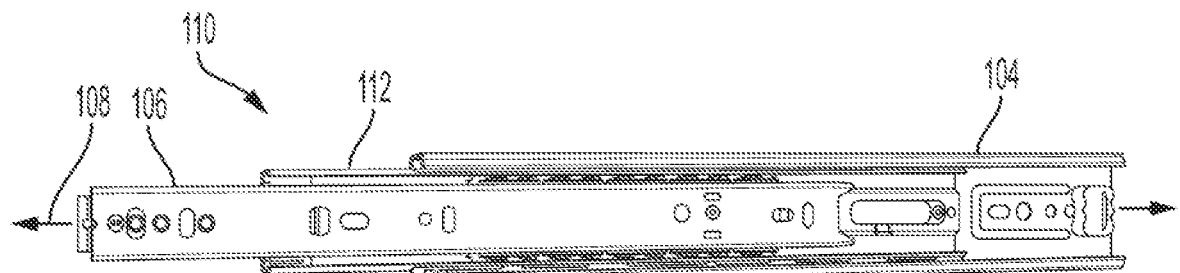
FIG. 5 is a bottom view of a slide for use in the sweeping attachment as in FIG. 2.
Figure 6:
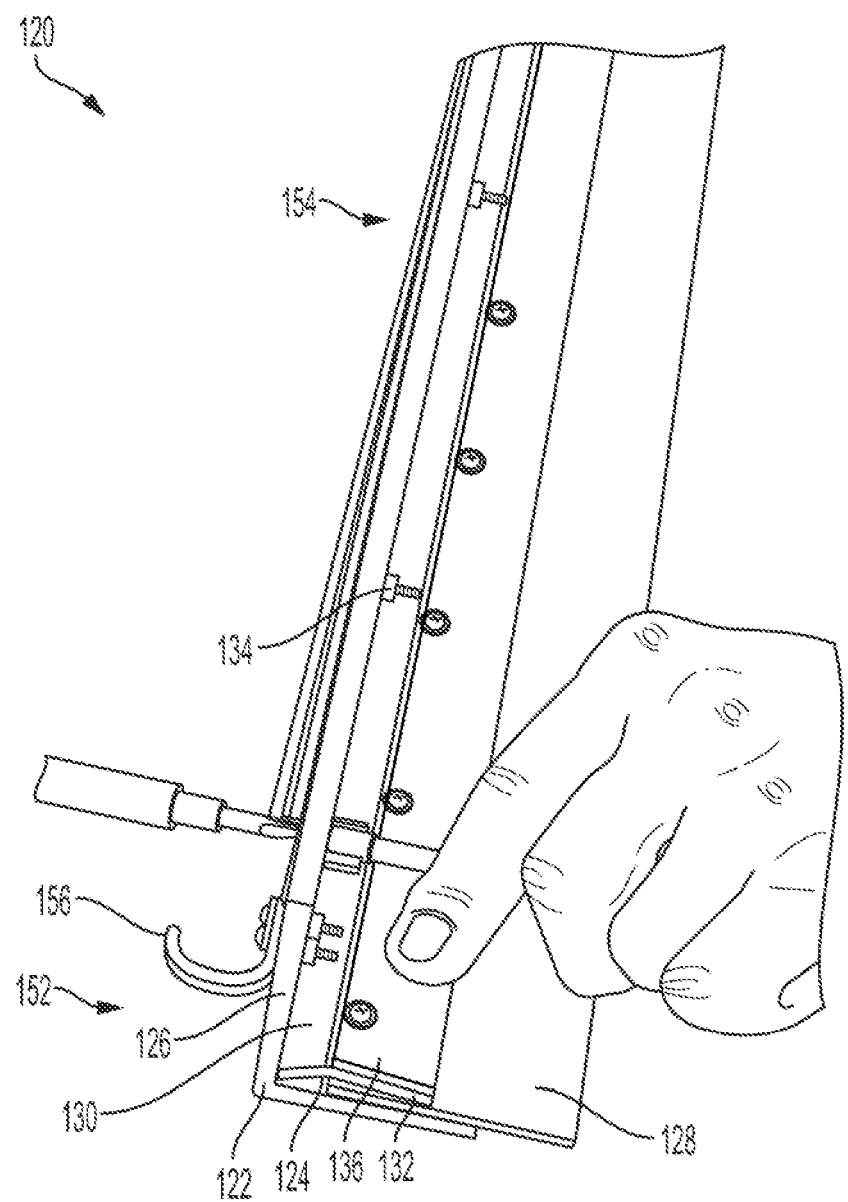
FIG. 6 is a perspective view of the sweeping assembly of the sweeping attachment as in FIG. 2 during assembly.
Figure 7:
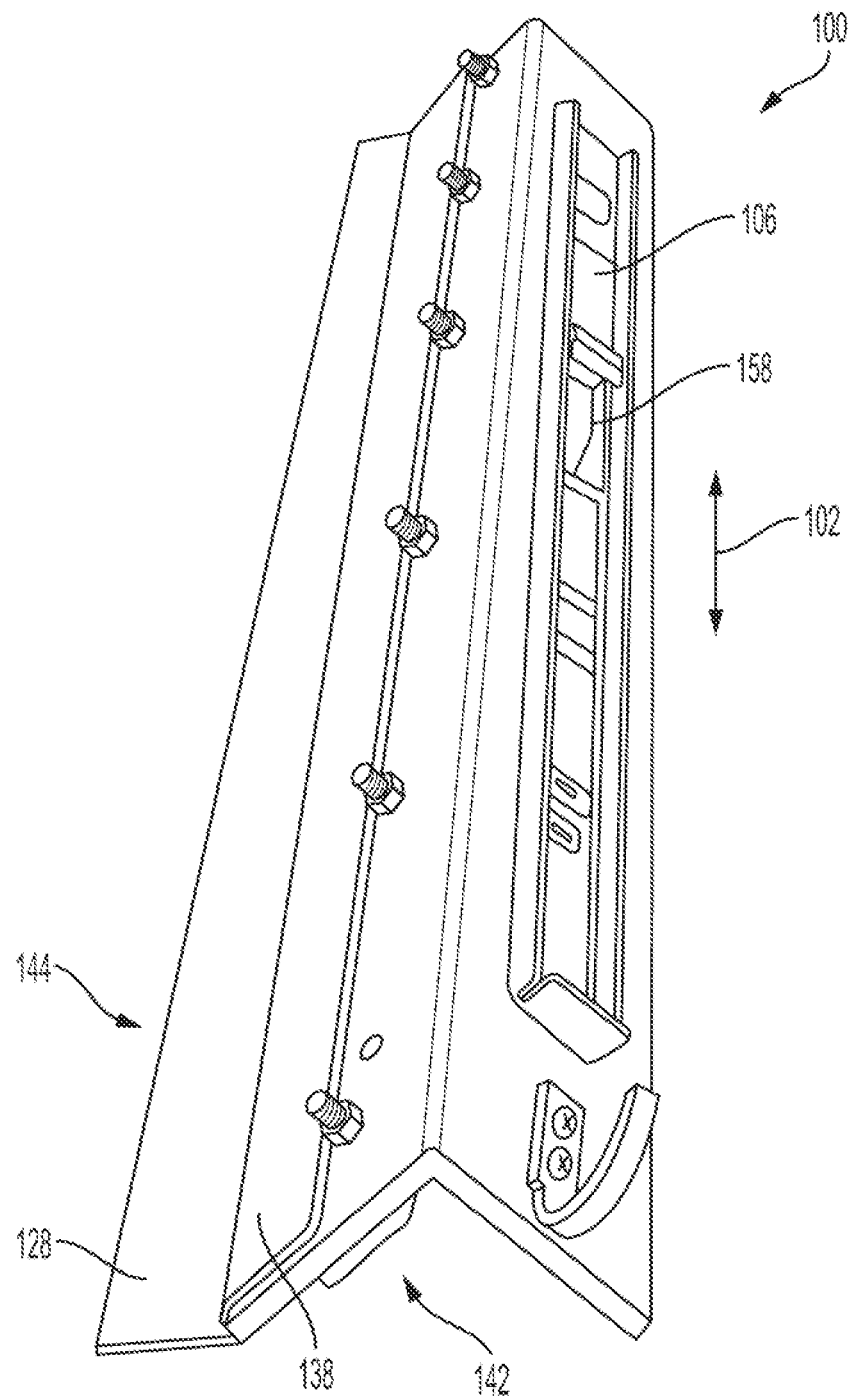
FIG. 7 is a perspective view of the sweeping assembly of the sweeping attachment as in FIG. 2.
Figure 8:
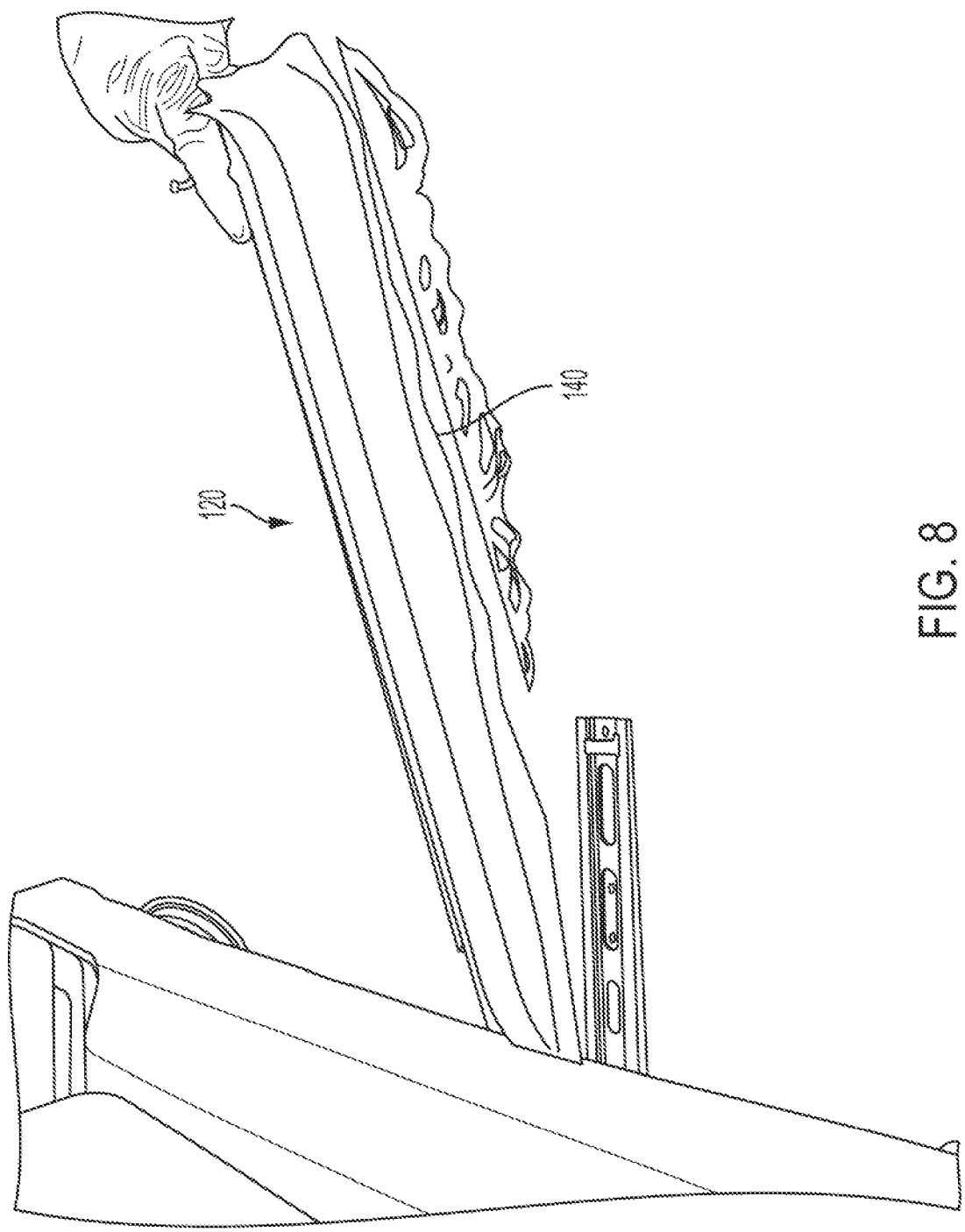
FIG. 8 is a perspective view of the cleaning cart of FIG. 2 with the sweeping assembly partially removed from the cleaning cart.
Figure 9:
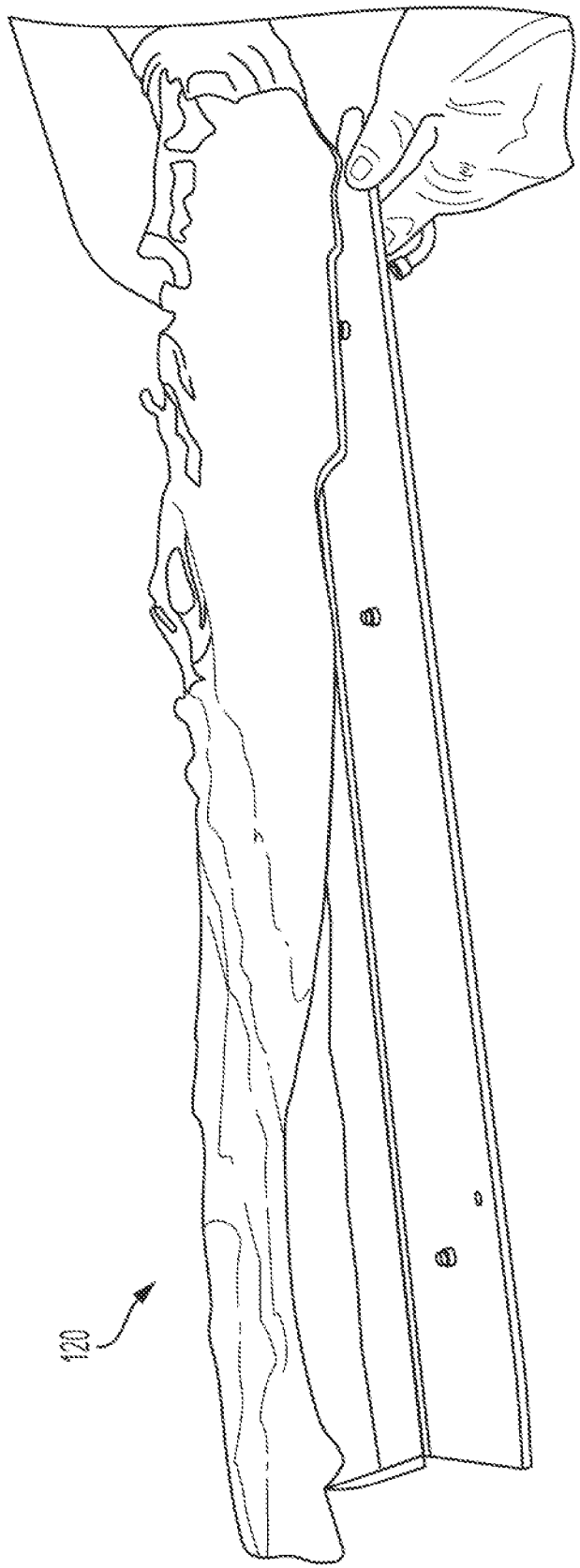
FIG. 9 is a perspective view of the sweeping assembly of a sweeping assembly as in FIG. 2 during removal of a sweeping element, showing a disposable dust sheet.
Figure 10:
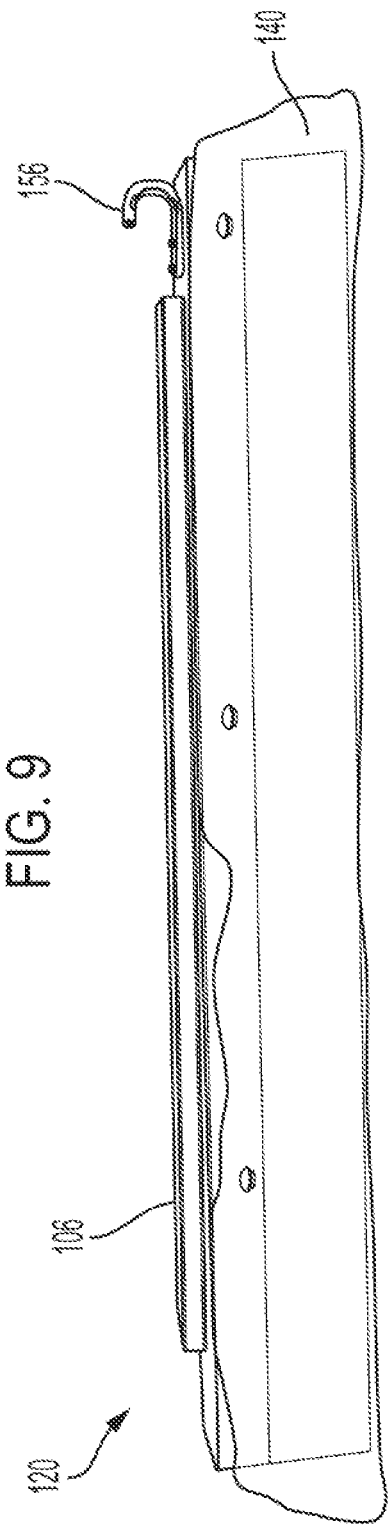
FIG. 10 is a perspective view of the sweeping assembly as in FIG. 9 with a clean sweeping element.

Referring also to FIGS. 5-7, the sweeping attachment 100 can comprise a track 104 that is mounted or otherwise coupled to the underside 28 of the body. The track 104 can couple to the body 12 via screw, rivets, adhesive, or other suitable fasteners. For example, in some aspects, self-tapping screws can extend through the track 104 and into the body 12 of the cart 10. A carriage 106 can slide with respect to the track along an axis of movement 108. The axis of movement 108 can optionally be parallel to the axis of elongation of the sweeping attachment 100. In further aspects, the axis of movement 108 can be perpendicular to the axis of elongation 102 of the sweeping attachment. For example, it is contemplated that the sweeping attachment 100 can slide in the longitudinal dimension of the cart (e.g., from the front or the rear of the cart between the respective front or rear wheels). In further aspects, the axis of movement 108 can be oriented at an acute angle with respect to the axis of elongation 102. Optionally, the track 104 and carriage 106 can be components of a slide 110, such as, for example, a commercially available drawer slide (e.g., Grainger Part No. 4KRV8). The slide 110 can further comprise an intermediate portion 112 that defines a bearing race and facilitates movement between the track 104 and the carriage 106.

The sweeping attachment can comprise a sweeping assembly 120 that is coupled to the carriage 106. The sweeping assembly can comprise a biasing element 128, such as, for example, a flexible, resilient polymer strip (e.g., a strip comprising abrasion-resistant polyurethane rubber), that extends sufficiently downward from the carriage 106 to engage a surface (e.g., floor) beneath the cart. The sweeping assembly can comprise a bracket that couples the biasing element 128 to the carriage 106. For example, the bracket can comprise an L-channel 122 (e.g., a 6063 aluminum, 3/16" thick, ninety degree angle channel). The L-channel can comprise a first leg 124 that abuts and couples to the carriage 106 and a second leg 126 that extends vertically (or generally vertically) downward therefrom. The biasing element 128 can couple to the second leg 126 of the L-channel 122 and extend downwardly therefrom (optionally, by about one inch) to engage the floor. It is contemplated that it can be beneficial for the biasing element 128 to bend slightly upon engagement with the floor to apply a downward pressure to the floor for providing a sweeping force. Optionally, a strip 130 (e.g., an aluminum strip) can extend across the biasing element 128 on a side opposite the L-channel second leg 126, and fasteners 134 (e.g., bolts and nuts, rivets, etc.) can fasten the biasing element 128 to the L-channel 122. The strip 130 can be, for example, carpet seam binder that can have a slight bend defining a concavity that can face the biasing element so that as the strip 130 is tightened down against the biasing element 128, the strip 130 can deflect. In this way, an edge 132 of the strip 130 can engage the biasing element 128, rather than just at the areas proximate to the fasteners 134.

In some aspects, the sweeping assembly 120 can comprise a front-facing side 142 and a rear-facing side 144. Optionally, the first leg 124 of the L-channel 122 can extend forwardly from the second leg 126, and the biasing element 128 can attach to the front-facing side 142 of the sweeping assembly 120. It is contemplated that mounting the biasing element 128 on the front-facing side of the sweeping assembly can help to maintain the shape of the biasing element.

At least one hook-type reclosable fastener 136 (that is, a hook of a hook and loop fastener) can be positioned on a first side (e.g., the front-facing side 142) of the sweeping assembly. For example, a strip of hook-type fastener can extend along the length of the sweeping assembly. In further aspects, a hook-type fastener can be positioned at a plurality of segments (optionally, small (e.g., optionally, about 1-inch of length segments)) spaced along the length of the sweeping assembly. Likewise, a second hook-type fastener 138 can be positioned on a second side (e.g., the rear-facing side 144) of the sweeping assembly 120. The second hook-type faster 138 can similarly be a strip that extends along the length of the sweeping assembly or one or more segments (optionally, small (e.g., optionally, about 1-inch length segments)) spaced along the length of the sweeping assembly. The first and second hook-type reclosable fasteners 136, 138 can attach to the L-channel 122 of the sweeping assembly 120 via a pressure-sensitive adhesive that can be disposed on a side of the fasteners opposite the hook engagement side. In further aspects, the reclosable fasteners 136, 138 can couple to the L-channel 122 of the sweeping assembly 120 via any suitable fasteners.

The sweeping assembly 120 can have a length (along the axis of elongation 102) that is less than or equal to the width of the cart. In further aspects, the sweeping assembly 120 can have a length that is between 85% and 90% of the width of the cart, between 90% and 95% of the width of the cart, between 95% and 100% of the width of the cart, between 1001% and 105% of the width of the cart, or between 90% and 100% of the width of the cart. In further optional aspects, the sweeping assembly 120 can have a length that is greater than 105% of the width of the cart or less than 85% of the width of the cart. In some further aspects, the sweeping assembly 120 can have a length so that the sweeping assembly 120 is entirely, or substantially entirely, within the footprint of the body of the cart. In this way, the sweeping assembly is not a tripping hazard. Thus, for example, for a sweeping assembly 120 that is angled with respect to the transverse axis by forty-five degrees, the sweeping assembly 120 can optionally have a length that is 1.4 times the width of the cart and can still be positioned entirely within the footprint of the cart. More generally, in various optional aspects, it is contemplated that the sweeping assembly 120 can be positioned at any suitable angle that results in the sweeping assembly having an operative dimension measured along the transverse axis that is less than, equal to, or substantially equal to the width of the cart.

A sweeping element 140, such as, for example, a dust sheet, can be connected at a first end to the first hook-type fastener 136, looped around the biasing element 128, and attached to the second hook-type fastener 138. The sweeping element 140 can be an EASY TRAP sweep and dust sheet provided by 3M or any other suitable sweeping element. In some aspects, the sweeping element can be a disposable dust sheet. In further aspects, the dust sheet can be a reusable dust sheet. In still further aspects, the sweeping element can be a reusable attachment, such as a broom that defines a plurality of bristles.

Figure 3:
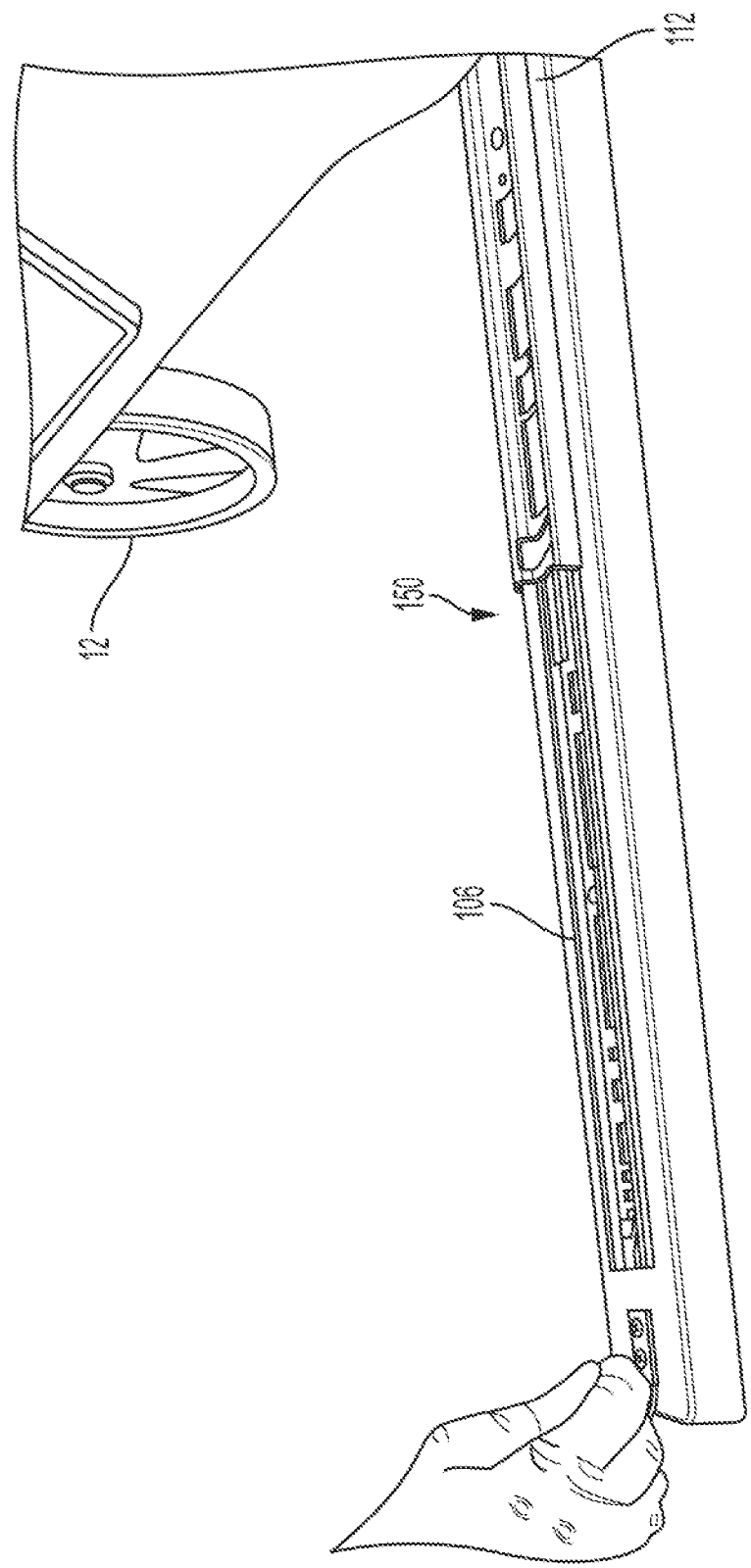
FIG. 3 is a perspective view of a cleaning cart as in FIG. 2 comprising a sweeping attachment in an extended, changing configuration.
Figure 4:
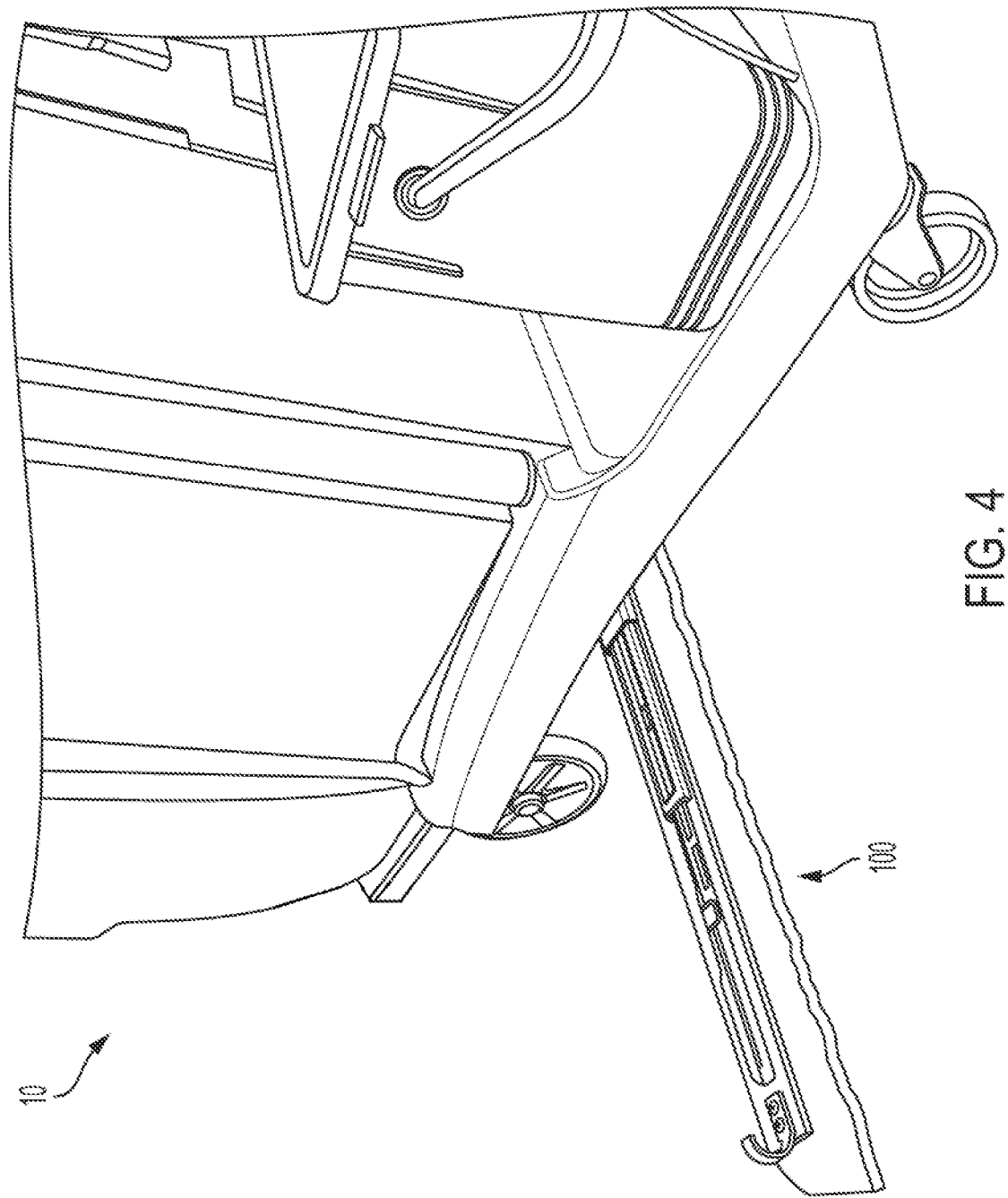
FIG. 4 is a perspective view of a cleaning cart as in FIG. 2 comprising a sweeping attachment in an extended, changing configuration.

The sweeping assembly 120 can couple to the carriage 106 of the slide 110 via fasteners 146, such as, for example, nuts and bolts, or rivets. The sweeping assembly 120 can be movable, via the slide 110 about and between a first, sweeping position 148 (FIG. 2) that is at least partially, or, optionally, entirely disposed beneath the cleaning cart 10, within the footprint 16 and a second, removal position 150 (FIG. 3) that is at least partially outward of the footprint 16 of the cleaning cart 10. The sweeping attachment 100 can have a distal first end 152 and a proximal second end 154. A grip 156, such as, for example, a hook, handle, and the like, can be coupled to the L-channel 122 at the distal end 152 of the sweeping attachment 100. The grip 156 can enable an operator to pull the sweeping assembly from the sweeping position 148 to the removal position 150.

The sweeping assembly 120 and coupled carriage 106 can be decoupled from the cleaning cart. For example, the slide 110 can comprise a release lever 158 (e.g., a detent) that can release a catch on the carriage 106 to decouple the carriage from the remainder of the slide 110, and, thus, the cleaning cart 10. Such release levers are commonly included on off-the-shelf drawer slides and are not described in detail herein. In this way, the sweeping element 140 can be changed without the difficulty of climbing under the cart and threading the sweeping element 140 between the floor and the biasing element. After removing and replacing the sweeping element 140, the sweeping assembly and carriage 106 can be reattached to the cleaning cart 10 and returned to the sweeping position 148.

Optionally, it is contemplated that the sweeping attachment 100 can be manufactured entirely from off-the-shelf components. Further, the sweeping attachment 100 can be retrofitted on conventional cleaning carts. In positioning the sweeping attachment 100 within the footprint of the cleaning cart, the sweeping attachment can be used without providing a tripping hazard or otherwise affecting the use of the cleaning cart. Further, by positioning the sweeping attachment 100 between the front and rear wheels, the sweeping attachment 100 can be coupled to conventional cleaning carts that do not have space in front of the front wheels or behind the rear wheels to position the sweeping attachment within the footprint of the cleaning cart. In providing the sliding aspect of the sweeping attachment 100, despite positioning the sweeping attachment 100 within the footprint when the sweeping assembly 120 is in the sweeping position 148, the sweeping element 140 can easily be removed and replaced.

Most cleaning service providers have large numbers (e.g., tens) of such conventional cleaning carts that are routinely moved throughout the facilities in which they are being used. However, the conventional cleaning carts are moved throughout the facility without cleaning along the way. Therefore, brooms, mops, or sweepers have to be separately passed over the same floor space across which the carts travel. Although some wheeled powered sweeping/vacuuming apparatuses exist, largely due to cost and storage, cleaning services have a fraction of the number of such wheeled sweeping apparatuses (if any) in comparison to the number of cleaning carts. In contrast, the carts disclosed herein do not include powered sweeping/vacuuming components, and the carts disclosed herein can be easily manufactured using conventional (unpowered) carts and off-the-shelf components.

Exemplary Aspects

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A cleaning cart comprising: a body defining an underside and at least one shelf, wherein the body has a footprint; a plurality of wheels rotatably coupled to the body; and a sweeping attachment coupled to the underside of the body, the sweeping attachment comprising: a slide comprising: a track that is coupled to the body; and a carriage that is configured to slide relative to the track along a movement axis about and between a first position that is generally within the footprint of the body and a second position that is generally outside of the footprint of the body; and a sweeping assembly coupled to the carriage, wherein the sweeping assembly extends downwardly from the carriage and is configured to couple to a sweeping element.

Aspect 2: The cleaning cart of aspect 1, further comprising the sweeping element, wherein the sweeping element is coupled to the sweeping assembly, wherein the sweeping element is configured to engage a surface beneath the body of the cleaning cart during movement of the cleaning cart.

Aspect 3: The cleaning cart of aspect 1 or aspect 2, wherein the plurality of wheels comprise two front wheels and two rear wheels, wherein the sweeping attachment is disposed between the two front wheels and the two rear wheels.

Aspect 4: The cleaning cart of any one of the preceding aspects, wherein the body has a longitudinal dimension, wherein the movement axis is substantially perpendicular to the longitudinal dimension of the body.

Aspect 5: The cleaning cart of any one of the preceding aspects, wherein the sweeping assembly comprises an L-channel that is elongate along the movement axis, wherein the L-channel has a first leg and a second leg, wherein the first leg is coupled to the carriage, wherein the second leg extends vertically downwardly from the first leg.

Aspect 6: The cleaning cart of any one of the preceding aspects, wherein the sweeping assembly comprises a biasing element that is configured to engage the sweeping element with a surface below the cleaning cart.

Aspect 7: The cleaning cart of aspect 6, wherein the biasing element comprises at least one flexible polymer strip that extends along the movement axis and extends downwardly a sufficient distance to engage a floor surface below the cleaning cart.

Aspect 8: The cleaning cart of any one of the preceding aspects, wherein the sweeping element is a disposable dust sheet.

Aspect 9: The cleaning cart of any one of the preceding aspects, further comprising a handle coupled to the sweeping assembly at a distal end of the sweeping assembly.

Aspect 10: The cleaning cart of any one of the preceding aspects, wherein the carriage comprises a release that is configured to decouple the carriage from the track.

Aspect 11: The cleaning cart of any one of the preceding aspects, wherein the body of the cleaning cart defines at least one compartment having a top opening.

Aspect 12: The cleaning cart of any one of the preceding aspects, wherein the footprint of the body has a width along a transverse axis that is perpendicular to the longitudinal axis, wherein the sweeping assembly has a length that is between 90% and 105% of the width of the footprint of the body.

Aspect 13: The cleaning cart of any one of the preceding aspects, wherein the footprint of the body has a width along the transverse axis, wherein the sweeping assembly has a length that is between 90% and 100% of the width of the footprint of the body.

Aspect 14: The cleaning cart of any one of the preceding aspects, wherein, when the carriage is in the first position, the sweeping assembly is substantially within the footprint of the body of the cleaning cart.

Aspect 15: The cleaning cart of any one of the preceding aspects, wherein, when the carriage is in the first position, the sweeping assembly is entirely within the footprint of the body of the cleaning cart.

Aspect 16: The cleaning cart of any one of the preceding aspects, wherein, when the carriage is in the second position, the sweeping assembly is substantially entirely outside of the footprint of the body of the cleaning cart.

Aspect 17: A sweeping attachment that is configured to be coupled to an underside of a body of a cleaning cart, the sweeping attachment comprising: a slide comprising: a track; and a carriage that is configured to slide relative to the track along an axis about and between a first position and a second position that is spaced from the first position along the axis, a sweeping assembly coupled to the carriage, wherein the sweeping assembly is configured to couple to a sweeping element.

Aspect 18: The sweeping attachment of aspect 17, wherein the sweeping assembly comprises an L-channel that is elongate along the axis of the carriage, wherein the L-channel has a first leg and a second leg, wherein the first leg is coupled to the carriage, wherein the second leg extends vertically downwardly from the first leg.

Aspect 19: The sweeping attachment of aspect 17 or aspect 18, wherein the sweeping assembly comprises a biasing element that is configured to engage the sweeping element with a surface below the cleaning cart.

Aspect 20: The sweeping attachment of aspect 19, wherein the biasing element comprises at least one flexible polymer strip that extends along the axis of the slide and extends downwardly a sufficient distance to engage a floor surface below the cleaning cart.

Aspect 21: The sweeping attachment of any one of aspects 17-20, further comprising the sweeping element coupled to the sweeping assembly, wherein the sweeping element is configured to engage a surface beneath the sweeping attachment during movement of the sweeping attachment.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A cleaning cart comprising:
   a body defining an underside and at least one shelf, wherein the body has a footprint;
   a plurality of wheels rotatably coupled to the body; and
   a sweeping attachment coupled to the underside of the body, the sweeping attachment comprising:
      a slide comprising:
         a track that is coupled to the body; and
         a carriage that is configured to slide relative to the track along a movement axis about and between a first position that is generally within the footprint of the body and a second position that is generally outside of the footprint of the body; and
      a sweeping assembly coupled to the carriage, wherein the sweeping assembly extends downwardly from the carriage and is configured to couple to a sweeping element.

2. The cleaning cart of claim 1, further comprising the sweeping element, wherein the sweeping element is coupled to the sweeping assembly, wherein the sweeping element is configured to engage a surface beneath the body of the cleaning cart during movement of the cleaning cart.

3. The cleaning cart of claim 2, wherein the plurality of wheels comprise two front wheels and two rear wheels, wherein the sweeping attachment is disposed between the two front wheels and the two rear wheels.

4. The cleaning cart of claim 1, wherein the body has a longitudinal dimension, wherein the movement axis is substantially perpendicular to the longitudinal dimension of the body.

5. The cleaning cart of claim 1, wherein the sweeping assembly comprises an L-channel that is elongate along the movement axis, wherein the L-channel has a first leg and a second leg, wherein the first leg is coupled to the carriage, wherein the second leg extends vertically downwardly from the first leg.

6. The cleaning cart of claim 1, wherein the sweeping assembly comprises a biasing element that is configured to engage the sweeping element with a surface below the cleaning cart.

7. The cleaning cart of claim 6, wherein the biasing element comprises at least one flexible polymer strip that extends along the movement axis and extends downwardly a sufficient distance to engage a floor surface below the cleaning cart.

8. The cleaning cart of claim 1, wherein the sweeping element is a disposable dust sheet.

9. The cleaning cart of claim 1, further comprising a handle coupled to the sweeping assembly at a distal end of the sweeping assembly.

10. The cleaning cart of claim 1, wherein the carriage comprises a release that is configured to decouple the carriage from the track.

11. The cleaning cart of claim 1, wherein the body of the cleaning cart defines at least one compartment having a top opening.

12. The cleaning cart of claim 1, wherein the footprint of the body has a width along a transverse axis that is perpendicular to the longitudinal axis, wherein the sweeping assembly has a length that is between 90% and 105% of the width of the footprint of the body.

13. The cleaning cart of claim 1, wherein the footprint of the body has a width along the transverse axis, wherein the sweeping assembly has a length that is between 90% and 100% of the width of the footprint of the body.

14. The cleaning cart of claim 1, wherein, when the carriage is in the first position, the sweeping assembly is within the footprint of the body of the cleaning cart.

15. The cleaning cart of claim 1, wherein, when the carriage is in the first position, the sweeping assembly is entirely within the footprint of the body of the cleaning cart.

16. The cleaning cart of claim 1, wherein, when the carriage is in the second position, the sweeping assembly is outside of the footprint of the body of the cleaning cart.

* * * * *